STAGE FOR OPAQUE PROJECTOR

Filed Aug. 11, 1958 4 Sheets-Sheet 1

INVENTORS
HENRY T. WILTON
WILLIAM E. FOLEY
BY Herbert C. Kimball
ATTORNEY

Aug. 23, 1960 | H. T. WILTON ET AL | 2,949,813

STAGE FOR OPAQUE PROJECTOR

Filed Aug. 11, 1958

4 Sheets-Sheet 2

INVENTORS
HENRY T. WILTON
WILLIAM E. FOLEY
BY Herbert C. Kimball
ATTORNEY

Aug. 23, 1960 H. T. WILTON ET AL 2,949,813

STAGE FOR OPAQUE PROJECTOR

Filed Aug. 11, 1958 4 Sheets-Sheet 3

INVENTORS
HENRY T. WILTON
WILLIAM E. FOLEY
BY
Herbert C. Kimball
ATTORNEY

INVENTORS
HENRY T. WILTON
WILLIAM E. FOLEY
BY Herbert C. Kimball
ATTORNEY

United States Patent Office 2,949,813
Patented Aug. 23, 1960

2,949,813

STAGE FOR OPAQUE PROJECTOR

Henry T. Wilton and William E. Foley, Buffalo, N.Y., assignors to American Optical Company, Southbridge, Mass., a voluntary association Filed Aug. 11, 1958, Ser. No. 754,256

5 Claims. (Cl. 88—24)

This invention relates to the positioning simply and rapidly of a card holder with relation to the stage of an optical projector, and more particularly an opaque projector which is used to magnify the material recorded on a reduced scale on a card.

For instance, an entire treatise on a particular subject may be reproduced from one or more such cards by projecting onto a screen an enlarged image of the material printed on the card or cards. As the reader desires additional portions of the material to appear on the screen he uses the controls provided by the present invention to shift the card holder with relation to the stage. He may wish to read further down a column, or he may wish to shift laterally to take in a different portion of the page. The present invention has for one of its objects to provide one control for shifting the card holder in an up and down direction and a second control for shifting the card holder in a lateral direction, the two controls being conveniently arranged on the stage so that it is a simple matter to go from one control to the other. A further object of the invention is to provide a counterbalance for the card holder where the stage is tilted substantially from the horizontal to facilitate projection of the image into the most comfortable reading position.

In the accompanying drawings which illustrate the invention

When projecting material to a considerably enlarged size, it is quite common to use a folded optical system, that is one which is rendered more compact by reflection of the image forming light rays onto the viewing screen. It is convenient with such a folded optical system to incline the axis of projection to the vertical, and accordingly to incline the stage so that the sheet material shall be normal to the axis of projection. As the operator of the projector watches the enlarged image, he manipulates the stage controls to shift the material to the right or left and forward or back. Convenience in the manipulation, of these controls is mandatory if he is not to be diverted from observing the image to take time out to operate the controls. Moreover, with a slanting stage there is a tendency for the support for the material to move downgrade more readily than upgrade. The improvement made by the present invention deals with these problems.

Figure 1:
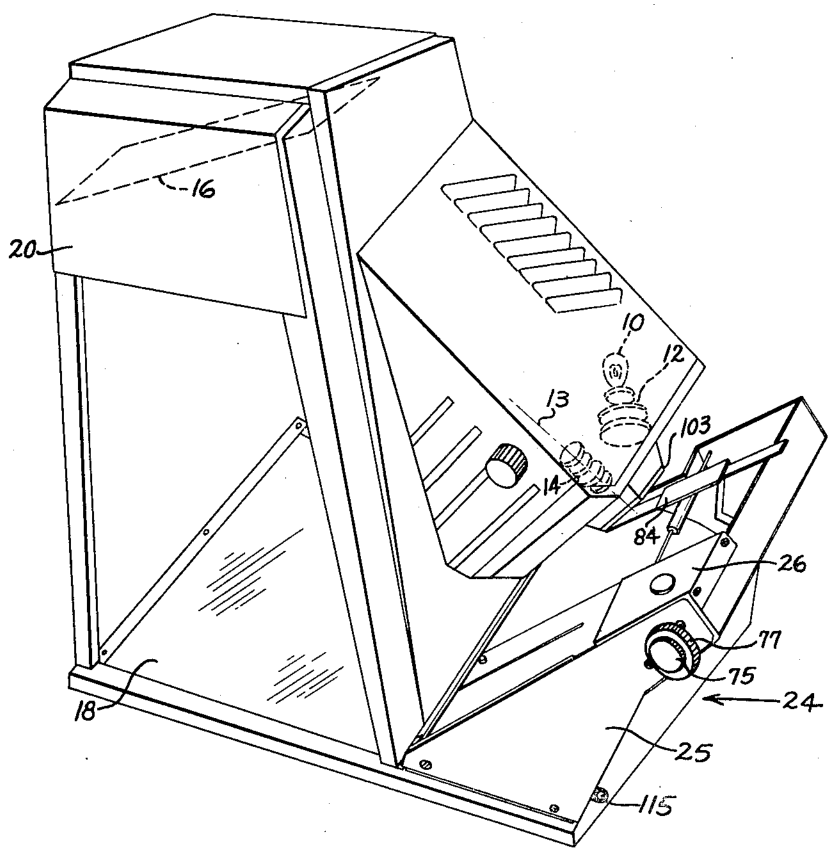
Fig. 1 is a perspective view of an opaque projector having a stage for presenting a card holder for projection of information recorded in condensed form on a card in the holder, and controls for shifting the card holder up and down as well as laterally in accordance with the invention, the card holder being omitted in this view to show the underlying mechanism of the stage.

An optical projector of the above-mentioned type is shown in Fig. 1. The optical system is shown schematically with light which issues from a source 10 collected by the condenser 12 so as to illuminate material on the stage. The axis of projection 13, which is the optical axis of the objective 14, is inclined to the vertical in order that a mirror 16 may be used to produce the image in a convenient location for reading. Thus the image forming rays are directed downwardly upon the screen 18, protected from stray light by the housing 20, where the image may be conveniently observed by the user of the projector.

Figure 10:
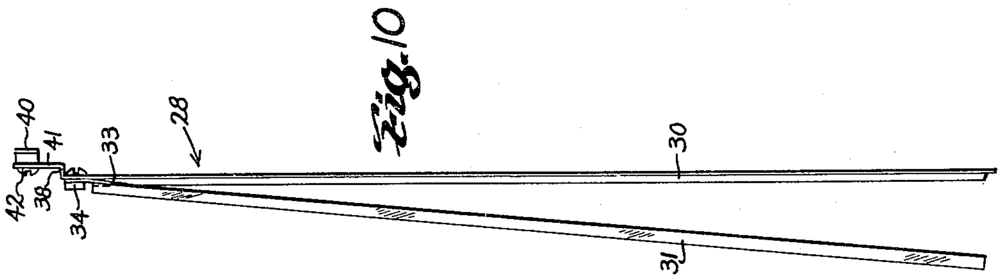
Fig. 10 is a side view of the card holder.
Figure 9:
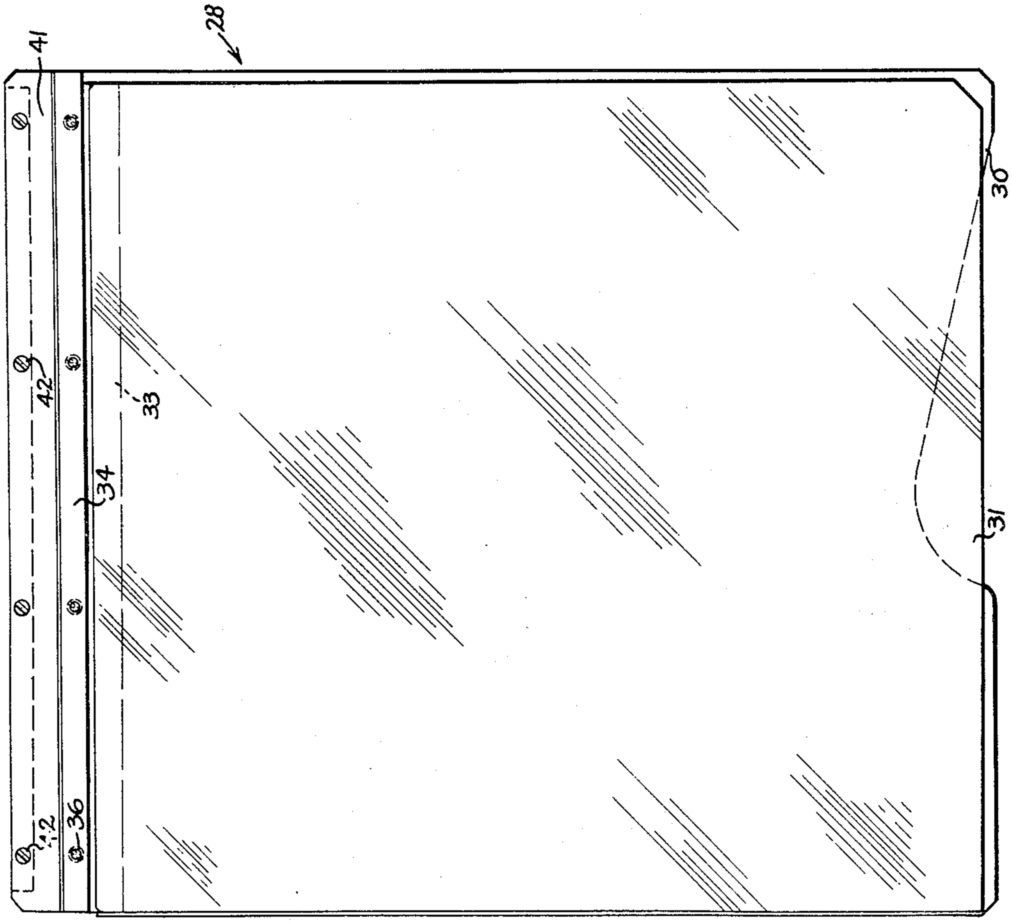
Fig. 9 is a plan view of the card holder.

The stage 24 may be constructed with a housing 25 of any suitable construction, for instance of sheet metal; and the material to be projected will rest upon a bed 26 arranged normal to the axis of projection 13. The device for holding the sheet material, which is termed herein the card holder 28, is moved over the bed 26 as the operator manipulates the controls of the stage. This card holder 28 may comprise a plate 30 with a transparent cover 31 for retaining the sheet material on the plate 30 as shown in Figs. 9 and 10. In the specific embodiment shown, the plate 30 is of metal such as stainless steel, and the cover 31 is of glass. The hinge between the two is formed by a strip 33 of stout fabric or tape which is caused to adhere to the glass 31 and to a binder 34 by means of a cement, preferably one of the epoxy resin cements. Screws 36 extend through the hinge strip 33 and the binder 34 from the plate 30 to fasten the hinge and therefore the plate 31 to the plate 30.

The portion of the plate 30 above the binder 34 is bent and rebent to form a rabbet 38; and a rack 40 is secured by screws 42 to the back side of the upper edge 41 of the plate 30. This rack 40 cooperates with the mechanism of the stage to effect up and down, as well as lateral movements of the card holder 28 in a manner which will now be described.

Figure 4:
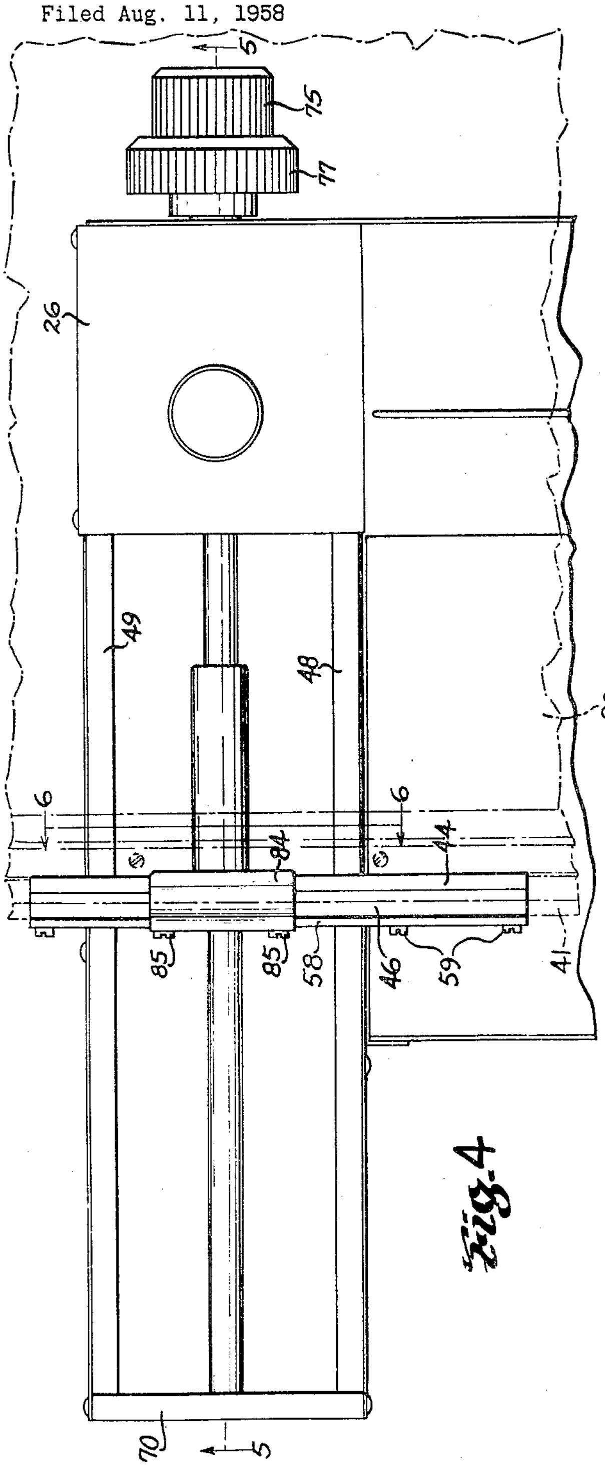
Fig. 4 is a plan view of the stage turned into a horizontal plane, the card holder being shown in phantom to illustrate more clearly the mechanism of the stage.

A guide member 44 (see Figs. 4 and 5) together with a keeper 58 provide a trough-like track 46 which receives and guides the rack 40 of the card holder 28 as it moves over the stage 24. By moving the rack 40 along the trough-like track 46, the card holder 28 is shifted laterally, and by bodily moving the member 44 so as to carry the rack 40 with it, the card holder is shifted in an up and down direction. During such bodily movement of the member 44, it rides on two side rails or stringers 48 and 49, which in addition brace the sheet metal housing 25 of the stage. Parallel with the side rails and intermediate them are two control shafts, one of which (the upper shaft 50 shown in Fig. 5) rotates a pinion 52 for moving the rack 40 along the trough-like track 46, and the other of which (the lower shaft 62), shoves the guide member 44 bodily along the rails 48 and 49.

Figure 6:
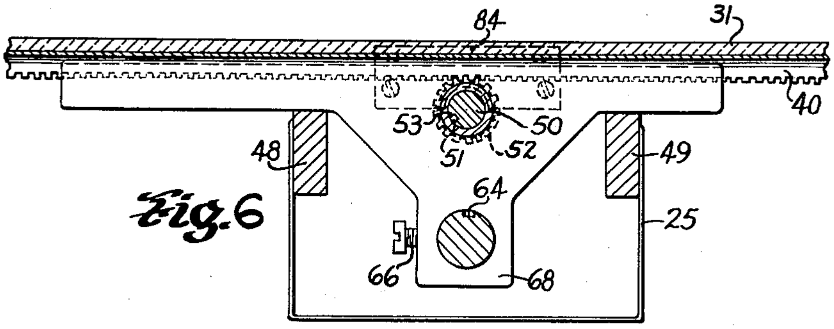
Fig. 6 is a transverse section taken on the line 6—6 in Fig. 4.

As indicated in Fig. 6, the upper shaft 50 has a groove 51 cooperating with a pressed pin 53 in the pinion 52. This pinion is a captive gear which moves along the shaft 50 as the member 44 moves; and turning of the shaft 50 causes turning of this pinion 52, no matter where along the shaft 50 it happens to be, because of the cooperating groove 51 in the shaft and the pressed pin in the pinion 52. A washer 55 is interposed between pinion 52 and the body of member 44, and a washer 56 is interposed between pinion 52 and a keeper 58 secured by screws 59 to the body of member 44. It will be noted from Figs. 5 and 6 that a bore is formed in the member 44 in which the shaft 50 is rotatable; and that to accommodate the pinion 52, this bore is opened out as a recess as shown at 60 in Fig. 5.

Figure 5:
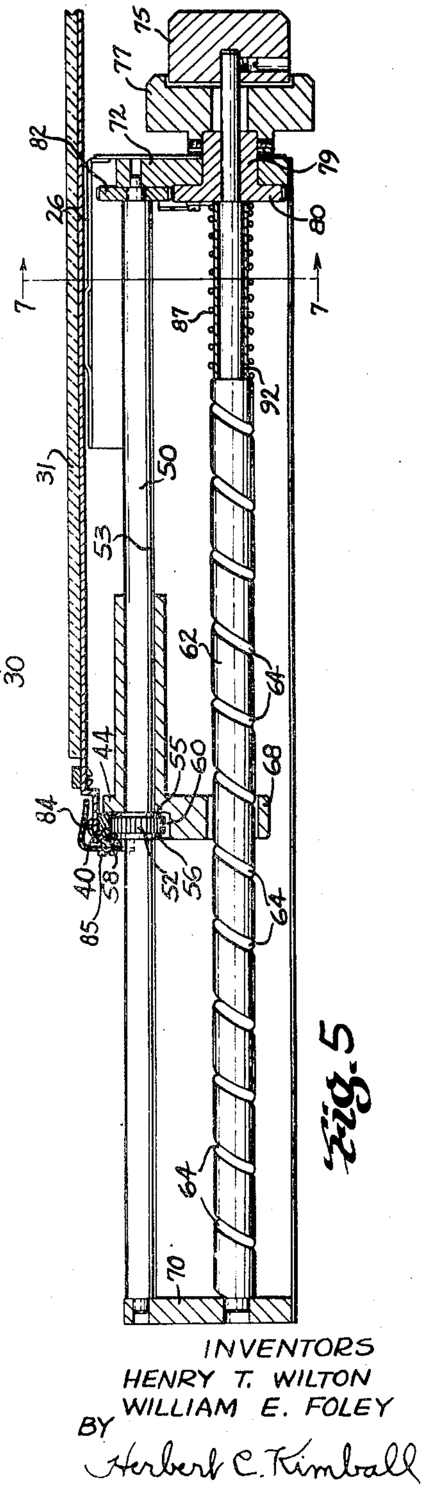
Fig. 5 is a longitudinal section taken on the line 5—5 in Fig. 4.

The lower shaft 62 is formed with a worm groove 64 engaged by a follower or guide pin 66 (see Fig. 6) which is threaded through the depending portion 68 of the member 44. Because of this engagement of the guide pin 66 in the worm groove 64, the member 44 is advanced or retracted as the shaft 62 is turned in one direction or the other. As shown in Fig. 5 the remote ends of shafts 50 and 62 are rotatably mounted in an end plate 70 of the housing 25 of the stage. The near end of the shaft 50 is rotatably mounted in a second end plate 72 which underlies the bed 26 of the stage 24. The rotatable mounting of the near end of shaft 62 involves the control mechanism which effects shifting of the card holder relative to the stage, and this control mechanism will now be described.

Such shifting of the card holder is controlled by two knobs, one of which is numbered 75 and is fixed directly to the end of shaft 62 which projects beyond the plate 72, and the other of which is numbered 77 and is between the knob 75 and the plate 72. The knob 77 surrounds the shaft 62 but is not necessarily in contact therewith. It is fixed to the hub 79 of a gear member 80 which drives a pinion 82 fixed on the shaft 50. Accordingly when the knob 77 is turned, the gear couple 80, 82 causes rotation of the shaft 50 to bring about movement of the rack 40 along the trough-like track 46.

The hub 79 is journaled in the end plate 72, and rotatably supports the shaft 62 which extends through it. This construction permits the control for advancing or retracting the card holder and the control for shifting the card holder laterally to be coaxial, and so closely adjacent that the operator may rotate both controls together and may also shift rapidly from one to the other for precise positioning of the material being projected onto the screen 18.

A spring cap 84 overlies the edge 41 of the plate 30 so as to yieldably retain the rack 40 in the track 46. This cap 84 is secured by screws 85 extending through the keeper 58 into the guide member 44. When it is desired to remove the card holder from the stage, it is merely necessary to pull the rack 40 along the track 46 until the rack 40 is out of mesh with the pinion 52.

Figure 2:
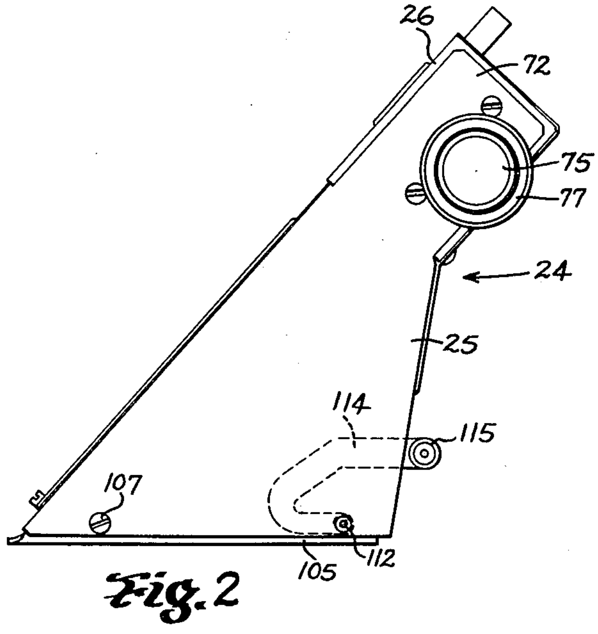
Fig. 2 is an end view in elevation and on an enlarged scale of the supporting structure for the stage and the control knobs which project therefrom.

Referring now to Figs. 1 and 2, it will be noted that there is a steep pitch to the bed 26 on which the card holder 28 rests, so that unless compensated there is considerable drag when the card holder is moved up-hill, or toward the right in Fig. 2. There is a corresponding acceleration in the down-hill direction when the card holder is moved toward the left. To compensate for this a coil spring 87 (see Fig. 7) is connected to the gear member 80 and to the housing 25 of the stage 24. One end 88 of the spring is secured to the gear member 80 by a screw 90 and the other end 89 hooks to the housing 25. The coil spring 87 is separated from the shaft 62 by a sleeve 92 anchored to the housing 25 by an arm 94.

Figure 7:
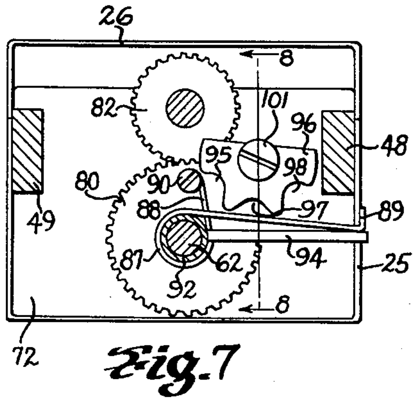
Fig. 7 is a detail sectional view taken on the line 7—7 in Fig. 5.
Figure 8:
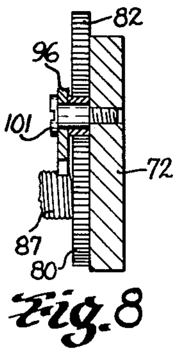
Fig. 8 is a transverse section taken on the line 8—8 in Fig. 7.

If the gear member 80 is turned in a counter-clockwise direction (as seen in Fig. 7) by its knob 77, the card holder 28 is shifted down-hill or to the left in Fig. 2, and at the same time the coil spring 87 is wound up, counterbalancing the force of gravity. As the screw 90 nears the completion of one turn, it enters the left hand scallop 95 of a cog 96 pivotally mounted on a screw 101. Continued rotation of the screw 90 carries the cog 96 with it until the screw 90 passes out of scallop 95. This leaves scallop 97 in position to be engaged by screw 90 on its next complete revolution. Again, the cog 96 is carried along, and on the third revolution the screw 90 enters scallop 98. As there are only three scallops, the fourth revolution of screw 90 brings it into engagement with the unscalloped edge of cog 96 to obstruct further turning of gear 80 in that direction. The amplitude of lateral movement of the card holder is determined in this way by four revolutions of the gear member 80 (and knob 77).

Rotation of the gear member 80 in the opposite direction is assisted by the torsion effect of the coiled spring 87. As the screw 90 nears the completion of each clockwise turn it engages the scallops 98, 97 and 95 in succession. Four complete turns restore the screw to the position shown in Fig. 7. The coil spring 87, accordingly, tends to carry the card holder in the up-hill direction and opposes its down-hill travel, as the control knob 77 is turned in one direction or the other, and the cog 96 limits the excursion in the down-hill direction (left as seen in Fig. 2).

By the time the gear member 80 has made sufficient revolutions to bring the screw 90 to the position shown in Fig. 7, the rack 40 has moved substantially out of engagement with the pinion 52. This means that no matter where the card holder 28 happens to be, the operator may remove it by gently pulling outwardly until the rack 40 runs out of mesh with the pinion 52. This happens simultaneously with the engagement of the screw 90 with the cog 96 in the extreme position of the screw 90, whereby the spring 87 holds the shaft 50 and pinion 52 at the extreme stop position. The card holder 28 may now be withdrawn from the stage, and when re-inserted, the pinion and rack are in correct position for re-engagement at the extreme position of all the mechanism.

Figure 3:
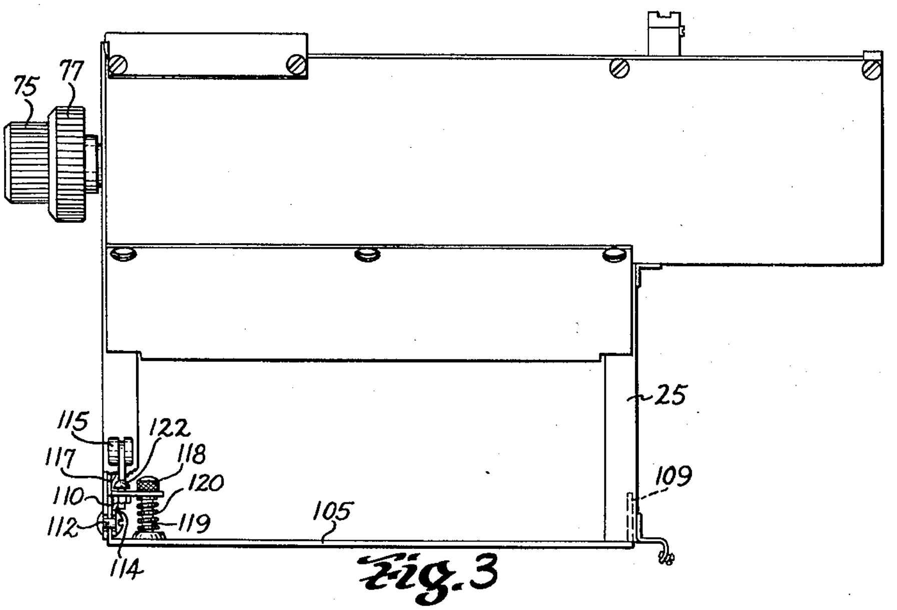
Fig. 3 is a lateral view of the supporting structure shown in Fig. 2, and taken from the right side of Fig. 2.

The card holder 28 is normally held by the stage 24 in tight engagement with the optical projector aperture 103 so as to be in the focal plane of the objective 14. It is desirable to release the pressure when removing a card from the holder 28 and when substituting another. For this purpose the housing 25 of the stage 24 is so mounted on the base 105 that it will tilt slightly about a pair of screws, one of which is shown at 107 in Fig. 2. As shown in Fig. 3 the housing 25 telescopes slightly the upturned side edges 109 and 110 of the base 105. A pivot 112 carried by the upturned edge 110 carries a lever 114 having a handle 115. A bracket 117 secured to the housing 25 extends beneath a knurled nut 118 on a post 119 secured in the base 105. A coil spring 120 surrounding the post 119 pushes upwardly against the bracket 117 and normally biases the stage 24 toward the aperture 103. The nut 118 is threaded on the post 119 for adjustment of the normal position of the stage 24. An abutment 122 is carried by the bracket 117 in alignment with the lever 114, and when the handle 115 is depressed the lever 114 comes in contact with the abutment 122 and the housing 25 is tilted away from the aperture 103 against the pressure of spring 120. The abutment 122 is made slightly adjustable so as to provide the proper release of pressure to permit removal of a card and the substitution of another.

A stage constructed in accordance with our invention is remarkably simple and handy in operation. When the handle 115 is depressed, the stage 24 is lowered slightly, and there is sufficient looseness between the plate of the card holder and its cover to permit the insertion or substitution of the desired card. Release of the handle 115 restores the upward pressure of the stage through the bed 26, to hold the card holder 28 in tight engagement with the aperture 103. The selection of the portion to be read having been decided upon, the operator finds it a simple matter to turn knob 77 to pick up the desired column or to turn knob 75 to move up or down the column. Because these two controls are coaxial, it is a remarkably simple matter to go from one to the other.

The steep slope of the stage is not troublesome because the spring 87 substantially counterbalances the downward tendency of the card holder 28. This coil spring is wound up as the cardholder moves down-hill, and uncoils as the cardholder moves up-hill. The cog 96 is a safety stop for preventing over-running of the card-holder 28 and its rack 40 in either direction. Thus, the operator can concentrate on study of the material projected on the screen 18, his operation of the concentric knobs 75 and 77 being for the most part subconscious. This simplifies the operation of the stage.

We claim:

1. A stage for an optical projector comprising a bed, a plate for supporting sheet material moveable over said bed, a guide for receiving and guiding an edge portion of said plate, said guide being moveable over said bed in a direction normal to said edge portion of the plate, thereby bodily moving said plate over said bed in said normal direction, said plate having a rack on said edge portion, a pinion housed in said guide for engaging said rack and shifting said plate along said guide transversely to said normal direction, a drive shaft extending through and having a slideable drive connection with said pinion, and means for moving said guide longitudinally of said shaft for bodily moving said plate over said bed in said normal direction.

2. A stage for presenting sheet material in position to be projected by an optical projector having its axis of projection inclined to the vertical comprising a bed normal to said axis of projection, a plate for supporting sheet material moveable over said bed, means for moving said plate over said bed having a guide member for receiving and guiding an edge portion of said plate, a rack on said edge portion, a pinion housed in said plate moving means for meshing with said rack and shifting said plate laterally along said guide member, a first longitudinal shaft extending through and having a slideable drive connection with said pinion, a second shaft parallel to said first shaft and having a threaded connection to said plate moving means for imparting longitudinal bodily movement to said plate moving means and to the plate received in the said guide member, and spring counterbalancing means connected to said first named shaft and to said bed for counterbalancing the weight of said plate.

3. A stage for presenting sheet material in position to be projected by an optical projector having its axis of projection inclined to the vertical comprising a bed normal to said axis of projection, a plate for supporting sheet material moveable over said bed, a rack on an edge portion of said plate, means for moving said plate over said bed having a guide member for receiving and guiding said edge portion of said plate, a pinion housed in said plate moving means for meshing with said rack and shifting said plate laterally along said guide member, a first longitudinal shaft extending through the pinion in said plate moving means and having a slideable drive connection with said pinion, a second shaft parallel to said first shaft and operatively connected to said plate moving means by a worm groove for imparting longitudinal bodily movement to said plate moving means and to the plate received in said guide member, and a counterbalancing spring connected to said drive shaft and to said bed for opposing the downgrade lateral movement of said plate over said bed.

4. A stage for presenting sheet material in position to be projected by an optical projector as claimed in claim 3 in which said guide member includes a lip overlying the edge portion of said plate for retaining said rack in said guide member.

5. A stage for presenting sheet material in position to be projected by an optical projector having its axis of projection inclined to the vertical comprising a bed normal to said axis of projection, a plate for supporting sheet material moveable over said bed, a guide member for receiving and guiding an edge portion of said plate, a rack on said edge portion, a pinion housed in said guide member and meshing with said rack, a manually rotatable element for rotating said pinion, to effect movement of said plate transversely over said inclined bed, and a Geneva stop actuated step by step by successive complete rotations of said manually rotatable element to bring said Geneva stop into position for arresting further rotation of said manually rotatable element.

References Cited in the file of this patent

UNITED STATES PATENTS

| | | |
|---|---|---|
| 2,260,551 | Boni et al. | Oct. 28, 1941 |
| 2,685,227 | Brietzke | Aug. 3, 1954 |
| 2,724,988 | Peters | Nov. 29, 1955 |